United States Patent

[11] 3,585,797

| [72] | Inventor | Harry C. Moon, Jr. Oglesby, Ill. |
|---|---|---|
| [21] | Appl. No. | 831,596 |
| [22] | Filed | June 9, 1969 |
| [45] | Patented | June 22, 1971 |
| [73] | Assignee | Sundstrand Corporation |

[54] HYDROSTATIC TRANSMISSION DISPLACEMENT CONTROL
12 Claims, 7 Drawing Figs.

| [52] | U.S. Cl. | 60/53 |
|---|---|---|
| [51] | Int. Cl. | F16d 31/06 |
| [50] | Field of Search | 60/53, 53 A |

[56] References Cited
UNITED STATES PATENTS

| 3,212,263 | 10/1965 | Hann | 60/53 A |
|---|---|---|---|
| 3,371,479 | 3/1968 | Yapp et al. | 60/53 A |
| 3,390,523 | 7/1968 | Heidemann | 60/53 A |
| 3,411,297 | 11/1968 | Hann | 60/53 A |
| 3,488,955 | 1/1970 | Buelow | 60/53 |
| 3,500,633 | 3/1970 | Livezey | 60/53 A |
| 3,507,117 | 4/1970 | Lauck | 60/53 |

*Primary Examiner*—C. J. Husar
*Attorney*—Hofgren, Wegner, Allen, Stellman & McCord

ABSTRACT: A servomechanism for the displacement control of a hydrostatic transmission which includes a manual control handle connected through a three-point link to position a displacement control servo valve, and a feedback connection to the link whereby the link has three pivotal interconnections with a spring biasing the servo valve in a direction to decrease the displacement of the transmission for the purpose of reducing backlash in the link and a second spring for urging the control handle linkage away from the link to reduce backlash between the control handle and the control handle linkage.

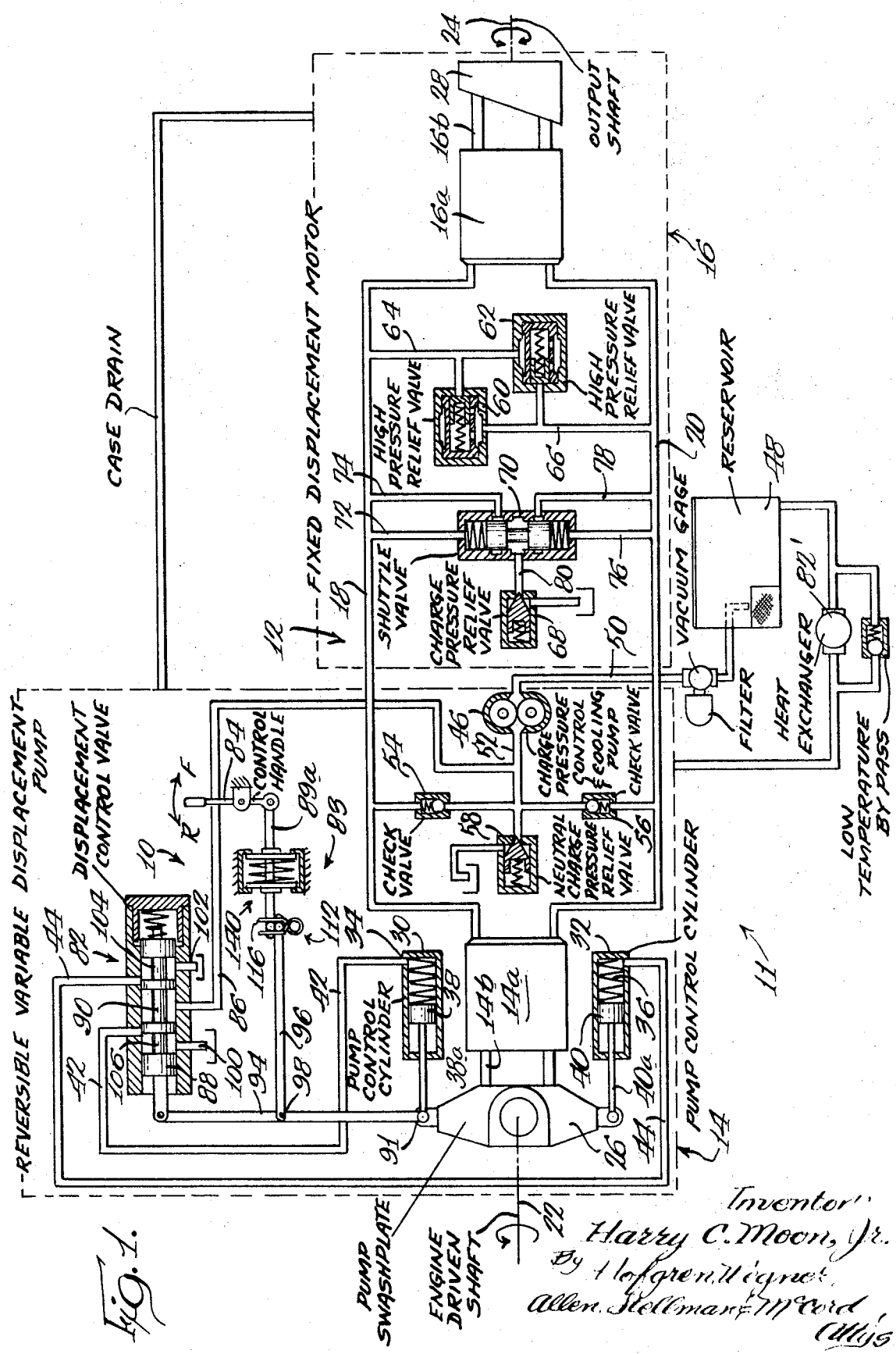

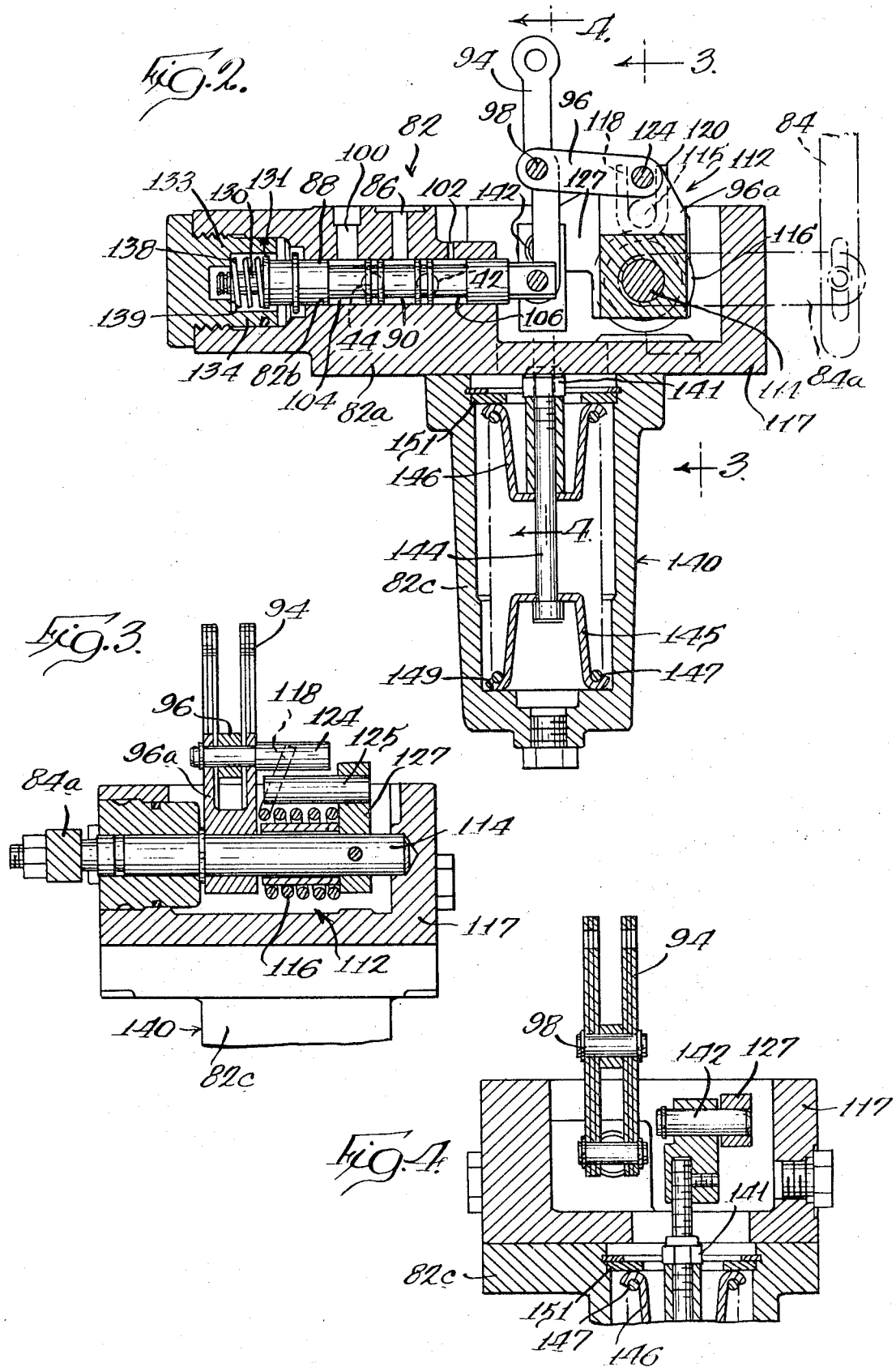

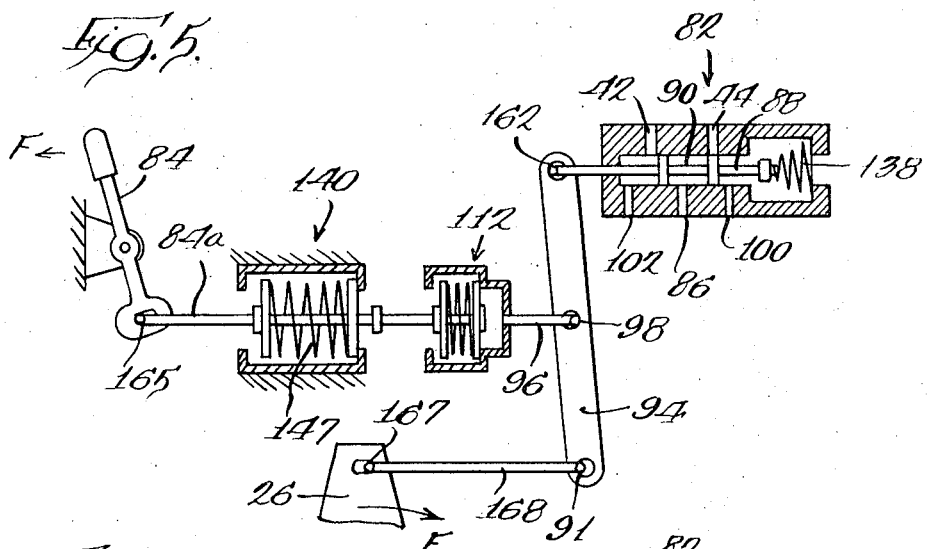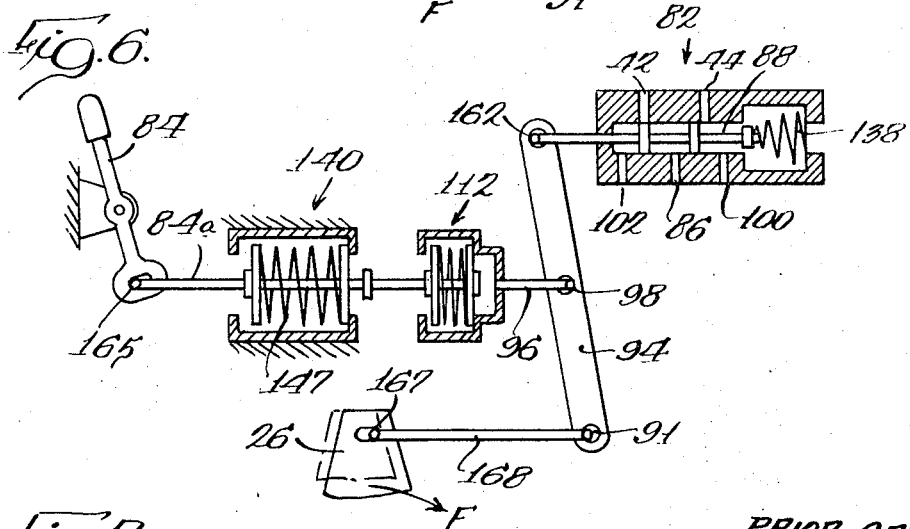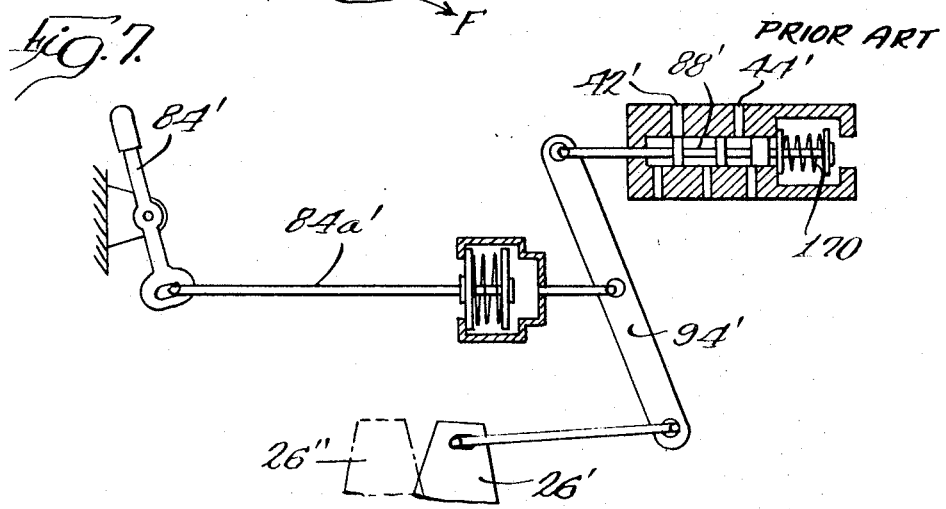

3,585,797

1

HYDROSTATIC TRANSMISSION DISPLACEMENT CONTROL

BACKGROUND OF THE INVENTION

Various types of servomechanisms have been provided for varying the displacement of one or both of the hydraulic units in hydrostatic transmissions. One such servomechanism is disclosed in the Hann U.S. Pat. No. 3,212,263, assigned to the assignee of the present invention. This prior transmission includes an axial piston pump having a swashplate inclinable in opposite directions from a neutral center position. Two hydraulic servomotors are provided for positioning the cam in opposite directions of movement. For the purpose of controlling the flow of hydraulic fluid selectively to these control motors a four-way servo valve is provided which has an open center position. For the purpose of positioning the servo valve and hence controlling the displacement of the pump an input and feedback control linkage is provided. This linkage consists mainly of a primary link with three pivotal interconnections, one with the displacement control valve, a second with a linkage associated with a manual control handle, and a third with the pump cam itself to provide feedback through the linkage to the displacement control valve.

To place the transmission in operation, the operator moves the control handle in one direction pivoting the main link about the feedback pivotal connection and shifting the displacement control valve to port fluid to the forward displacement control motor. The control handle may then be left in this position as the cam moves to the selected displacement position and pivots the main link about the control handle linkage pivot moving the displacement control valve back to a blocking position in which it maintains the selected displacement.

While this displacement control linkage arrangement has been found satisfactory in many applications in some instances the backlash in the main link and linkage associated with the control handle linkage has resulted in excessive speed variations. For example, if the transmission is associated with a vehicle and the vehicle changes from uphill operation to downhill operation a reversal of torque occurs in the transmission. This torque reversal results from the overrunning operation of the motor in which it acts as a pump with the pump then acting as a motor or a metering device in braking fashion. It is well known that the hydraulic moments acting on the swashplate or cam of an axial piston pump are stroke reducing while the hydraulic moments acting on the swashplate or cam of a similar motor are stroke increasing. Therefore, as the vehicle changes from uphill to downhill operation the moments on the pump cam change from stroke-reducing moments to stroke-increasing moments. The stroke-increasing moments acting on the cam under these conditions tend to shift this main link in a direction to move the displacement control valve to a position reducing the displacement of the cam to compensate for this stroke-increasing cam movement. However, because of the linkage arrangements in the above-described servo displacement control, and in other prior known displacement controls of which applicant is aware, the backlash in this main linkage under these conditions causes the pump cam to move excessively before this compensating movement is provided by the displacement control valve.

It is the object of the present invention to eliminate the excessive movement of the pump cam under these reverse torque conditions and thus minimize the speed changes as a vehicle goes from uphill to downhill operation.

SUMMARY OF THE INVENTION

In accordance with the present invention a displacement control is provided for the pump of a hydrostatic transmission that minimizes variations in vehicle speed in going from uphill to downhill travel by providing biasing springs in the servocontrol associated with the pump displacement mechanism which eliminate backlash in the linkages associated therewith as the torque in the transmission reverses and, more specifically, eliminate backlash even when the pump tends to operate as a motor. The present control includes a spring which biases the displacement control servo valve continuously in a direction tending to reduce this displacement of the pump. This has the effect of continuously biasing a main three-pivot control link in a counterclockwise direction. The effect of this spring is to immediately move the displacement control valve to a stroke-decreasing position as the stroke-increasing swashplate moments (during motoring) tend to move the pump cam in a stroke-increasing direction.

There is further provided a neutral centering spring in the control handle linkage between the control handle and the main three-pivot link which serves to bias the control handle linkage towards the control handle regardless of the mode of operation of the transmission and thereby eliminates backlash in the control handle, which would also contribute to excessive compensating movements of the pump cam during inherent braking operation.

BRIEF DESCRIPTION OF THE DRAWINGS

FIG. 1 is a schematic illustration of a hydrostatic transmission according to the present invention;

FIG. 2 is an enlarged cross section of the displacement control valve and control linkage according to the present invention;

FIG. 3 is a fragmentary section taken generally along line 3-3 of FIG. 2;

FIG. 4 is a fragmentary section taken generally along line 4-4 of FIG. 2;

FIGS. 5 and 6 are schematic views of the present displacement control illustrating, respectively, the forward and braking modes; and FIG. 7 is one prior art displacement control in the braking mode.

DETAILED DESCRIPTION OF THE PREFERRED EMBODIMENT

Referring to the drawings and particularly FIG. 1 a displacement control means 10 is shown in use with a hydrostatic transmission 11 including a closed hydraulic circuit 12 having an engine-driven pump 14 and a motor 16 supplied fluid by the pump. The pump and motor are hydraulically interconnected by main conduits 18 and 20 to establish a closed fluid circuit for pumping hydraulic fluid from the pump 14 to the motor 16 and to return fluid from the motor directly back to the pump. The drive output of an associated prime mover (not shown) is transmitted to the pump through a suitable shaft represented diagrammatically at 22. The output of motor 16 is transmitted to the driving wheels or tracks of the associated vehicle by a suitable shaft represented diagrammatically at 24.

Preferably both the pump and the motor are of the axial piston type having rotatable cylinder blocks 14a and 16a, respectively, each with a plurality of cylinders in annular array and reciprocal pistons 14b and 16b, respectively, having ends reciprocating in the cylinders. The pump 14 has a variable angle reversible swashplate or cam 26 engaged by projecting ends on pistons 14b for controlling the speed of the transmission as well as the direction thereof. The motor has a fixed displacement inclined cam plate 28 engaged by projecting ends of piston 16b.

For positioning the pump swashplate 26 two pump control cylinders 30 and 32 are provided. The pressurization of control cylinder 32 rotates the pump swashplate 26 in a clockwise direction tending to drive the vehicle in a forward direction, while the pressurization of pump control cylinder 30 tends to rotate the swashplate 26 in a counterclockwise direction to either reduce vehicle speed or reverse the direction of movement of the vehicle.

The pump control cylinders 30 and 32 house centering springs 34 and 36, respectively, and include pistons 38 and 40 on rods 38a and 40a, respectively, which are pivotally secured to the swashplate 26 for positioning the same in response to the supply of control fluid to the cylinders through conduits 42 and 44, respectively. The springs normally act through the pistons to position the pump swashplate as shown in FIG. 1 in a position of minimum displacement so there is no positive output from the pump. The control cylinders 30 and 32 are conventional single acting cylinders so that the influx of fluid under pressure in one cylinder will cause the swashplate to tilt or pivot in one direction while the influx of fluid to the other cylinder will cause reverse tilting so that either conduit 18 or 20 may be the supply conduit to reversely rotate motor 16.

A positive displacement gear-type replenishing, cooling and control fluid pump 46 is provided and is driven by the engine or prime mover of the transmission through suitable gearing (not shown). Replenishing, cooling and charge pump 46 is in communication with a reservoir 48 through an intake conduit 50 for supplying fluid to the system through a conduit 52. The capacity of pump 46 is sufficient to replace leakage fluid, to supply control fluid to the displacement control valve and to supply cooling fluid to the circuit in excess of that required for the aforementioned purposes in order to maintain the transmission cooling.

A pair of spring-biased check valves 54 and 56 are in communication with the conduit 52 and with the conduits 18 and 20, respectively, for supplying the replenishing and cooling fluid to the low-pressure side of the circuit through one check valve while pressure in the high-pressure conduit will maintain the other check valve closed. A makeup relief valve or neutral charge pressure relief valve 58 also communicates with the conduit 52 and serves to relieve excess fluid.

For establishing communications between the low-pressure one of the main conduits 18 or 20 and a low-pressure relief valve 68, a shuttle valve 70 is provided. The shuttle valve is in communication with the conduits 18 and 20 through conduits 72, 74, 76 and 78, and provides a means for removing heated oil displaced by cooling oil supplied by replenishing pump 46. The fluid pressure in the conduits 18 and 20 acts through the conduits 72 and 76, respectively, to appropriately position the shuttle valve so that communication is established from the low-pressure relief valve through a conduit 80 to the low-pressure side of the transmission circuit by means of either the conduit 74 or the conduit 78, so that the heated fluid may be drained through heat exchanger 82'. Shuttle valve 70 is spring centered to a closed position so that during the transition of reversing of pressure in the main conduits none of the oil is lost from the circuit.

The transmission includes overpressure relief valves 60 and 62 in communication with each of the main conduits by means of the conduits 64 and 66, respectively. These valves serve to prevent abnormally high pressure in either of the two main conduits 18 and 20 by relieving the circuit of surge pressures which may occur during rapid acceleration or abrupt braking. In response to this high pressure, the overpressure relief valves shift to dump the excess oil to the low-pressure side of the transmission circuit 12. For example, when an excessive pressure exists in line 18, fluid in conduit 64 will cause valve 60 to shift and shunt the fluid to conduit 20 through conduit 66.

The control 10 according to the present invention includes a displacement control valve 82 and a control handle assembly 83 having a control handle 84 for appropriately positioning the control valve. The control handle 84 is provided with conventional retention means for maintaining the handle in a preselected position to which it is manually moved. The control valve 82 is a four-way valve in communication with control fluid through conduit 86 which communicates with charge pump outlet conduit 52. Valve 82 includes a valve stem 88 having reduced diameter portions as indicated at 90. The valve stem is operatively associated with the control handle through a three point main link 94. Link 94 is pivotally connected one end to valve stem 88 and pivotally connected at the other end to swashplate 26 as indicated at 91. Intermediate the aforementioned pivotal securements, a control handle link 96 is pivotally secured to the link 94 at 98 so the movement of the control handle will appropriately position the valve stem for the metering of fluid through valve 82 to the displacement control motors 30 and 32.

As shown in FIG. 2 the control valve 82 is in its neutral or centered position so that control fluid from the pump by way of conduit 86 enters the valve, and while capable of flowing past the reduced diameter portion 90 of the valve stem 88, it is blocked by lands on stem 88 from passing out of the valve through either the conduit 42 or 44 so that no control fluid may be supplied to the pump control cylinders. However, the passing 42 and 44 from the pump control cylinders are in communication with drain conduits 100 and 102 by way of the valve stem reduced portions 104 and 106, respectively.

Movement of the control handle 84 imparts the desired directional movement to the vehicle. For example, when the control handle is moved to the left as shown in FIG. 1, the link 96 will move to the right thereby moving valve stem 88 as the link 94 pivots about the end of the swashplate. The control handle is provided with suitable friction means as described above so that it is retained in the selected position. As the valve stem moves to the right, communication is established around the reduced portion 90 between the conduit 86 and the conduit 44, supplying control fluid to the pump control cylinder 32 causing the pump swashplate to pivot in a clockwise direction. The pump control cylinder 30 continues to be connected to drain 100 through the conduit 42 and reduced portion 106.

As the swashplate tilts in a clockwise direction, the link 94 pivots counterclockwise about the point 98 causing the valve stem 88 to be moved to the left, toward the original neutral position. However, as the valve stem moves to the left the flow of control fluid to the cylinder 32 will be blocked by the valve stem, thus shutting off the supply of additional control fluid to cylinder 32. The termination of the supply of control fluid to the cylinder also terminates further movement of the swashplate thereby halting further movement of the valve stem 88. Thus, the valve achieves a closed position blocking the flow of control fluid to or from the control cylinder which is acting to displace the swashplate so that further swashplate displacement in either direction is prevented. The associated vehicle is thereby propelled in a forward direction by the motor 16. Handle 84 remains in a position to which it has been moved until it is again moved by the operator. If the swashplate 26 overshoots, a feedback signal is provided to the valve stem 88 by the swashplate through link 94 calling for an adjustment of the swashplate to correctly position it. Upon returning the control handle 84 to neutral, valve stem 88 is moved so that communication is established between the conduit 44 and the drain conduit 102 by the reduced portion 104 draining the control fluid from the cylinder 32 while control fluid is supplied to cylinder 30 through reduced portion 90 to return the swashplate to an upright or neutral position as shown in FIG. 1.

The connection of the control handle to the link 96 is illustrated in further detail in FIG. 3. It is to be noted that there is a yieldable connection between the control handle and the valve member so that excessive movement of the control handle by the operator will not be transmitted to the valve stem 88. In particular, the yieldable connection indicated generally at 112 is between the control handle and the linkage 96 for moving the valve stem. The control handle 84 is adapted to be suitably connected to a control arm 84a secured to one end of a control shaft 114. The shaft 114 has concentrically mounted thereon a coiled torsion spring 116 having outwardly projecting terminal fingers 118 and 120 at opposite ends thereof which tend to move toward each other but may be moved apart. Shaft 114 is pivotally mounted in a bracket extension 117 of valve housing 82a. The fingers 118 and 120 are offset axially from each other as well as being spaced relative to each other circumferentially, and a pair of pins 124 125 are positioned therebetween including pin 124 secured in the link 96 and in an arm 96a, and pin 125 secured in bracket 127 which is pinned to shaft 114. As the valve control handle 84 is moved, the shaft 114 will be turned and the pin 125 will bear against either the finger 118 or 120. The other finger of spring 116 will resiliently urge against the pin 124 for moving the link 96 in the desired direction. Normally, the spring transmits motion as a rigid member.

The torsion of the spring is such that if the handle 84 is moved sufficiently to jam the valve stem 88 to the limit of its permissible movement, spring 116 will yield in response to the opposition offered by valve stem 88 so that the handle movement is not transmitted directly to the valve member. Thus, rather than permit the excess force to be transmitted to the valve stem where it may cause damage thereto, such excess force is absorbed by the spring 116.

Referring to FIG. 2, it should be noted that valve body 82a has a main valve bore 82b with a counterbore at the left end thereof to facilitate assembly of the valve apparatus. Valve stem 88 has a reduced end portion 130, and a collar 131 is slidably mounted on this reduced portion and adapted to abut the shoulder between the reduced portion 130 and the main valve stem 88. In assembly, the valve stem 88 is positioned in the valve bore 82b, after which valve sleeve 133 is threadedly inserted into the valve counterbore with a terminal portion 134 slidably received in the valve stem 88.

The collar 131 on the reduced stem portion 130 provides a spring seat against which one end of a coil compression spring 138 bears. The other end of the spring bears against a spring set seat 139 defined within the valve sleeve 133.

In operation, the spring 138 is constructed to continuously bias the valve stem 88 to the right as shown in FIG. 2 toward a position porting fluid through conduit 42 tending to rotate the swashplate 26 in a counterclockwise direction which is either stroke reducing if the transmission is in a forward mode or stroke increasing if the transmission is in a reverse mode.

In order to obtain a positive neutral position of the pump swashplate, centering springs 34 and 36 in the cylinders 30 and 32 insure return of the pump swashplate to neutral.

For the purpose of biasing the control handle link 84a toward the control handle 84 to eliminate free play therebetween in the forward mode of operation of the transmission, a centering spring assembly 140 is shown illustrated in both FIGS. 1 and 2. As seen more clearly in FIG. 1, the centering spring assembly includes a vertically extending shaft 144 pivotally connected as at 142 to the link 127 at a point spaced from the axis of shaft 114. A hollow sleeve 141 threadably receives the shaft 144 and engages at its lower end a spring seat 146. An enlarged portion of shaft 144 engages lower spring seat 145. A coil compression spring 147 is seated within the spring seats 145 and 146 urging them apart toward positions engaging stationary abutments 149 defined by housing member 82c and a stationary ring 151, respectively. With the clockwise movement of shaft 114 as seen in FIG. 2 and the consequent upward movement of shaft 144, spring seat 146 remains stationary and shaft 144 will pull spring seat 145 upwardly compressing spring 147. This places a downward biasing force on shaft 144 and a counterclockwise biasing force on shaft 114. Conversely, if shaft 114 is rotated in a counterclockwise direction spring seat 145 will remain stationary and spring seat 146 will move downwardly compressing the spring, but in this case the spring will tend to urge the shaft 144 upwardly and bias the shaft 114 in a clockwise direction. Thus, spring 147 continuously tends to urge shaft 114 and link 84a to a neutral position. However, the centering force provided by spring 147 is not sufficient to overcome the means (not shown) which frictionally holds the control handle 84 in any desired position selected by the operator.

The operation of the above-described transmission control can be best appreciated by viewing the schematic illustrations in FIGS. 5 and 6. It should be understood with respect to FIGS. 5 and 6 as well as FIG. 7, that the slots for the pivotal interconnections have been elongated merely for the purpose of illustrating the direction of force at the pivotal interconnections. As illustrated in FIG. 5 the displacement control is in a position such that the transmission and the associated vehicle are being driven in a forward direction. That is, the handle 84 has already been shifted in the forward direction moving link 84a to the right, compressing neutral spring 147. This shifted link 96 to the right urging valve stem 88 to the right porting fluid through port 44 to the control cylinder 32 shifting the cam 26 in a clockwise direction in FIG. 5. Thereafter, the cam 26 moved into stroke-permitting link 94 to rotate counterclockwise moving valve stem 88 back to a position blocking flow relative to port 44 and arresting movement of the swashplate 26 in the desired position, which is the position shown in FIG. 5.

Under these conditions the centering spring 147 urges link 84a continuously to the left towards control handle 84 removing any free play at the interconnecting pivot 165. At the same time, spring 138 continuously urges valve stem 88 to the left producing contact at the left side of pivot 162 between the valve stem and the link 94. This tends to produce counterclockwise pivotal movement of the link 94 continuously about pivot 98. The result of this is that contact is maintained at the right side of pivot 98 and the left side of pivot 91, as well as the right side of pivot 167 between a link 168 (that interconnects cam 26 with the main link 94) and the cam.

Thus, all links in the kinematic chain are biased against their associated pins at the pivot points whereby eliminating all free play in the linkage. With the elimination of the free play in the linkage only a small movement of the swashplate 26 is required to shift the valve stem 88 from a position from where it was modulating the flow of pressure to control cylinder 32 to conduit 44, to a position where it modulates fluid flow across reduced stem portion to control fluid conduit 42 and control motor 30. Thus, the inherent stroke-redecing fluid pressure moments acting on the cam 26 during forward operation, if they cause shifting of the cam 26 in a counterclockwise direction (stroke reducing) in FIG. 5, will produce an immediate correction by shifting the valve stem 88 to the right to port fluid through conduit 44 to control cylinder 32 to effect an immediate correcting increase in the displacement of cam 26.

As will be apparent from viewing FIG. 6, an important aspect of the present invention is that the same linkage-biasing arrangement eliminates all free play in the linkage while the vehicle associated with the transmission changes from uphill operation to downhill operation when pressure in the main conduits 18 and 20 is reversed, so that motor 16 acts as a pump and pump 14 acts as a motor or a metering device. In this case, the fluid pressure moments acting on cam 26 are not stroke reducing as they are in the pumping mode but instead are stroke increasing. Nevertheless, the centering spring 140 and the valve-biasing spring 138 continue to maintain the linkages so that their associated pivots are biased in the same direction as they are in the forward mode and it is this relationship that minimizes overshoot of the cam 26 during downhill movement of the associated vehicle. More specifically, centering spring assembly 140 in the downhill mode shown in FIG. 6 continues to bias the pivotal interconnection between link 84a and handle 84 to the left. At the same time, valve spring 138 continues to urge main link 94 about pivot 98 so that the same kinematic relationship exists with respect to the link 94 in the downhill mode illustrated in FIG. 6 as in the uphill or forward mode illustrated in FIG. 5, and therefore no free play need be taken up as the vehicle changes from one mode to the other.

Assuming that the stroke-increasing moments acting on cam 26 in the downhill mode illustrated in FIG. 6 permits link 168 to shift somewhat to the right, spring 138 causes an immediate shifting of valve stem 88 to the left maintaining the same kinematic position of the pivots 162, 98 and 91 shown in FIG. 6 and causing rapid porting of fluid through conduit 42 to control motor 30 providing a compensating stroke-reducing movement to the cam 26.

The advantages of the present free-play-eliminating assembly are readily apparent from viewing the prior art construction in FIG. 7 which does not include the centering spring assembly 140 or the spring 138 which continuously biases valve stem 88 to the left. Instead a neutral centering spring 170 is provided for valve stem 88 which tends to move it to the neutral position. Comparing the kinematic positions of the pivots in the FIG. 5 forward mode with respect to the kinematic positions of the prior art linkages illustrated in FIG. 7, it is readily apparent that each pivot assumes an opposite relationship when subjected to the stroke-increasing moments on the swashplate 26' during downhill operation. Therefore, in order for the cam to be shifted back to its corrected position, it is necessary that it shifts much further in a stroke-increasing direction under the influence of the swashplate moments to take up the free play in the linkages before the valve stem 88 can be shifted sufficiently to port fluid through port 42' to control cylinder 30 to reduce the pump displacement to its originally selected value. It is this excessive movement of the cam in the prior art construction that causes an excessive change in the vehicle speed as it changes from uphill to downhill operation.

I claim:

1. A hydrostatic transmission, comprising: a hydraulic pump unit, a hydraulic motor unit, conduit means interconnecting said units, fluid operable means for varying the displacement of one of said units, a servo valve for controlling fluid to said fluid operable means movable to a first position porting fluid to said fluid operable means and a second position porting fluid from said fluid operable means, manual control means, linkage means interconnecting said manual control means and said servo valve means, means connecting said fluid operable means to said linkage means to provide position feedback, and means for reducing backlash in linkage means resulting from a torque reversal in said units including means continuously biasing said servo valve means in one direction regardless of the servo valve being in the first or second position.

2. A hydrostatic transmission, comprising: a hydraulic pump unit, a hydraulic motor unit, conduit means interconnecting said units, fluid operable means for varying the displacement of one of said units, a servovalve for controlling fluid to said fluid operable means, manual control means, linkage means interconnecting said manual control means and said servo valve means, means connecting said fluid operable means to said linkage means to provide position feedback, and means for reducing backlash in said linkage means including means for continuously biasing said valve means in only one direction.

3. A hydrostatic transmission, comprising: a hydraulic pump unit, a hydraulic motor unit, conduit means interconnecting said units, fluid operable means for varying the displacement of one of said units, a servo valve for controlling fluid to said fluid operable means, manual control means, linkage means interconnecting said manual control means and said servo valve means, means connecting said fluid operable means to said linkage means to provide position feedback, means for reducing backlash in said linkage means and said manual control means resulting from a reversal of torque in said units including spring means biasing said servo valve means in one direction and means biasing said manual control means away from said linkage means.

4. A hydrostatic transmission comprising: an axial piston hydraulic pump, a hydraulic motor, conduit means interconnecting the pump and motor, pivotal cam means for varying the displacement of the pump, fluid operable means for positioning the cam means, servo valve means for porting fluid relative to said fluid operable means, a manual control handle to position said servo valve means, a three-pivot-point link for pivoting said servo valve means, control linkage interconnecting said control handle and said link at one of the points, means interconnecting the servo valve means and the link at a second of said points, means interconnecting said cam means and said link at a third of said points to provide position feedback, and means for reducing backlash in said link caused by the pump acting as a motor including spring means for biasing said servo valve means continuously in a direction tending to reduce the displacement of the pump.

5. A hydrostatic transmission as defined in claim 4, including means for eliminating backlash in said control linkage including means biasing said control linkage toward said control handle.

6. A hydrostatic transmission as defined in claim 5, wherein said servo valve includes a first port when pressurized tending to increase pump displacement and a second port when pressurized tending to decrease pump displacement, said cam means being connected to said link at a position so that in response to stroke-reducing movements on the cam means the link will tend to move the servo valve to a position pressurizing the first port and in response to stroke-increasing moments on the cam means will tend to move the servo valve means to a position pressurizing said second port.

7. A hydrostatic transmission as defined in claim 6, wherein said means biasing said control linkage includes a centering spring.

8. A hydrostatic transmission as defined in claim 7, wherein said first point is intermediate with respect to said second and third points.

9. A hydrostatic transmission as defined in claim 7, including a yieldable linkage in said control linkage means.

10. A hydrostatic transmission, comprising: a hydraulic pump unit, a hydraulic motor unit, conduit means interconnecting said hydraulic pump and motor units, fluid operable means for varying the displacement of one of said units, servo valve means for controlling fluid relative to said fluid operable means, manual control means, link means interconnecting said manual control means with said servo valve means, feedback means connected to said servo valve means, feedback means connected to said fluid operable means and said link means, said link means having three pivotal interconnections respectively with said valve means, said control means and said feedback means, and means for biasing said pivotal interconnections in the same direction regardless of the direction of movement of the fluid operable means.

11. A hydrostatic transmission, comprising: a hydraulic pump unit, a hydraulic motor unit, conduit means interconnecting said units, fluid operable means for varying the displacement of one of said units, a servo valve for controlling fluid to said fluid operable means, manual control means, linkage means interconnecting said manual control means and said servo valve means, means connecting said fluid operable means to said linkage means to provide position feedback, means for reducing backlash in said manual control means including a link in said manual control means and means for biasing the link away from said link means.

12. A hydrostatic transmission, comprising: a hydraulic pump unit, a hydraulic motor unit, conduit means interconnecting said units, fluid operable means for varying the displacement of one of said units, a servo valve for controlling fluid relative to said fluid to said fluid operable means and a second position porting fluid from said fluid operable means, a rigid link interconnecting said fluid operable means and said servo valve to effect feedback, a manually controlled link interconnecting said fluid operable means and said servo valve to effect feedback, a manually controlled link connected to said rigid link to position the same in accordance with the desired displacement of the hydraulic unit, and means for reducing backlash in the connection with the rigid link including means continuously biasing said servo valve in one direction regardless of the servo valve being in the first or second position and means continuously biasing said manual link in one direction with respect to the rigid link regardless of whether the servo valve is in the first position or the second position.

PO-1050
(5/69)

UNITED STATES PATENT OFFICE
CERTIFICATE OF CORRECTION

Patent No. 3,585,797  Dated  June 22, 1971

Inventor(s)  HARRY C. MOON, JR.

It is certified that error appears in the above-identified patent and that said Letters Patent are hereby corrected as shown below:

Column 8, lines 33 and 34, delete "feedback means connected to said servo valve means,"

Column 8, line 56, after "relative" delete "to said fluid"; same line, after "means" insert
--movable to a first position porting fluid to said fluid operable means--;
lines 59, 60, 61, delete "a manually controlled link interconnecting said fluid operable means and said servo valve to effect feedback,"

Signed and sealed this 30th day of May 1972.

(SEAL)
Attest:

EDWARD M. FLETCHER, JR.
Attesting Officer

ROBERT GOTTSCHALK
Commissioner of Patents